US007151577B2

(12) United States Patent
Yamamoto et al.

(10) Patent No.: US 7,151,577 B2
(45) Date of Patent: Dec. 19, 2006

(54) BROADCAST RECEIVING SYSTEM AND METHOD, AND MEDIUM STORING A BROADCAST RECEPTION CONTROL PROGRAM

(75) Inventors: Kazuhiko Yamamoto, Daito (JP); Hirotsugu Suzuki, Daito (JP)

(73) Assignee: Funai Electric Co., Ltd., Daito (JP)

( * ) Notice: Subject to any disclaimer, the term of this patent is extended or adjusted under 35 U.S.C. 154(b) by 823 days.

(21) Appl. No.: 10/038,725

(22) Filed: Jan. 8, 2002

(65) Prior Publication Data

US 2002/0089608 A1   Jul. 11, 2002

(30) Foreign Application Priority Data

Jan. 9, 2001   (JP)   ............................. 2001-000016

(51) Int. Cl.
*H04N 5/46*   (2006.01)
(52) U.S. Cl. ...................... 348/729; 348/725; 348/731; 348/733
(58) Field of Classification Search ................ 348/729, 348/725–727, 731–733, 735, 738, 553; 455/266, 455/260, 264, 340, 188.1; *H04N 5/46*
See application file for complete search history.

(56) References Cited

U.S. PATENT DOCUMENTS 4,939,789 A * 7/1990 Sakashita et al. ........... 455/260
5,148,280 A * 9/1992 Wignot et al. .............. 348/729
5,293,633 A * 3/1994 Robbins ...................... 725/144
5,507,025 A * 4/1996 Rodeffer ..................... 455/266
5,710,993 A * 1/1998 Brekelmans ............. 455/188.1
6,633,345 B1 * 10/2003 Izuta et al. .................. 348/729

FOREIGN PATENT DOCUMENTS

| JP | 56-086538  | 7/1981 |
| JP | 57-69356   | 4/1982 |
| JP | 61-081034  | 4/1986 |
| JP | 11-225295  | 8/1999 |

* cited by examiner

*Primary Examiner*—Trang U. Tran
(74) *Attorney, Agent, or Firm*—Crowell & Moring LLP

(57) ABSTRACT

For receiving a voice FM broadcast it has so far been necessary to separately provide an SAW filter and a voice intermediate frequency amplifier circuit and the freedom of circuit design has been limited.

In the present invention there is used a variable filter circuit 15 (a variable filter means). The variable filter circuit 15 allows an intermediate frequency signal (IF) to pass therethrough, the intermediate frequency signal being outputted from a mixing circuit 14 as a constituent of a tuner means. The variable filter circuit 15 can change a limitation on the frequency band of the intermediate frequency signal passing therethrough. The frequency band of the intermediate frequency signal passing through the variable filter circuit 15 is thereby limited according to the type of a received broadcasting radio wave, and a VCO circuit 32 (a variable oscillator means) is controlled so as to change the oscillation frequency of an oscillation signal.

12 Claims, 8 Drawing Sheets

PRIOR ART

BROADCAST RECEIVING SYSTEM AND METHOD, AND MEDIUM STORING A BROADCAST RECEPTION CONTROL PROGRAM

BACKGROUND OF THE INVENTION

1. Field of the Invention

The present invention relates to a broadcast receiving system and method for receiving a broadcasting radio wave and producing and outputting a video signal and an audio signal, as well as a medium which stores a broadcast reception control program.

2. Description of the Prior Art

Heretofore there has been known a broadcast receiving method wherein, with use of a broadcast receiving system in television, a broadcast radio wave in voice FM broadcast is received and is converted into an intermediate frequency signal, followed by amplification and detection to produce and output an audio signal. As this type of a broadcast receiving system there is known such a system as shown in a block diagram of FIG. 8. In the same figure, the broadcast receiving system roughly comprises a tuner IC 1, an SAW filter 2, a video intermediate frequency amplifier (VIF) circuit 3 and a detector circuit 4 both incorporated in a chroma IC, a VCO circuit 5, an SAW filter 6, a voice intermediate frequency amplifier (QIF) circuit 7, and a microcomputer 8.

The tuner IC 1, which is a frequency synthesizer type tuner, receives a broadcasting radio wave in television broadcast or voice FM broadcast, then converts it into an intermediate frequency signal and outputs the same signal, under control of the microcomputer 8.

The circuit which processes the intermediate frequency signal is a split carrier type circuit. In this circuit, the intermediate frequency signal passes through the SAW filter 2 when receiving television broadcast, while it passes through the SAW filter 6 when receiving voice FM broadcast. The SAW filters 2 and 6 are for removing a disturbance component from the intermediate frequency signal. But it is necessary that the frequency band for passage of the intermediate frequency signal be made narrower when receiving voice FM broadcast than when receiving television broadcast. For this reason the passing frequency band of the SAW filter 6 is set narrower than that of the SAW filter 2.

The intermediate frequency signal which has passed through the SAW filter 2 is subjected to intermediate frequency amplification in the VIF circuit 3 and is subjected to video detection in the detector circuit 4 in accordance with an oscillation frequency of an oscillation signal inputted from the VCO circuit 5, then is converted into an RGB signal. In the course of the intermediate frequency amplification there is produced a second voice intermediate frequency signal, which in the detector circuit 4 is subjected to amplification and FM detection into an AUDIO signal. As a result, an image is projected from a picture tube in accordance with the RGB signal and voice is outputted from a speaker in accordance with the AUDIO signal.

On the other hand, the intermediate frequency signal which has passed through the SAW filter 6 is subjected to intermediate frequency amplification in the QIF circuit 7 in accordance with the oscillation frequency of the oscillation signal inputted from the VCO circuit 5 and is inputted to the detector circuit 4, in which it is subjected to amplification and FM detection into an AUDIO signal. As a result, voice is outputted from the speaker.

There also is known such a broadcast receiving system as disclosed in JP-A No. 81034/1986. In this system, both a wide band pass filer and a narrow band pass filter which permits control of a resonance frequency according to channel selection are provided in a tuner portion and are used selectively. According to the construction disclosed therein, there is detected a displacement of carrier frequency from the output of a demodulation circuit and the resonance frequency is corrected in accordance with the detected displacement. According to the JP-A No. 81034/1986, both television broadcast and voice broadcast can thereby be received by a common tuner.

However, the above conventional broadcast receiving system involves the following problems.

In the former system, for the reception of voice FM broadcast it is necessary to separately provide an SAW filter and a voice intermediate frequency amplifier circuit. Besides, since it is necessary to let the pass band of the voice FM broadcast receiving SAW filter match the oscillation frequency of the oscillation signal outputted from the VCO circuit, it is impossible to use a general-purpose SAW filter and thus the freedom of circuit design is limited.

In the latter system, both television broadcast and voice broadcast can be received by a common tuner, but it is also required to let the pass band of the voice FM broadcast receiving SAW filter match the oscillation frequency of the oscillation signal outputted from the VCO circuit.

SUMMARY OF THE INVENTION

The present invention has been accomplished in view of the above-mentioned problems and it is an object of the invention to provide a broadcast receiving system which does not require a separate provision of a filter and an intermediate frequency amplifier circuit and which can improve the freedom of circuit design.

For achieving the above-mentioned object, in a first aspect of the present invention there is provided a broadcast receiving system comprising a high frequency amplifier circuit which receives and amplifies a broadcasting radio wave corresponding to a desired frequency and which provides an amplified output, a local oscillator circuit which produces and outputs in a PLL circuit a local oscillation signal having a local oscillation frequency corresponding to the desired frequency of the broadcasting radio wave, a mixing circuit which mixes the output provided from the high frequency amplifier circuit with the local oscillation signal provided from the local oscillator circuit to make conversion into an intermediate frequency signal and which outputs the intermediate frequency signal, a variable filter circuit which allows the intermediate frequency signal to pass therethrough, the variable filter circuit having a band-pass filter circuit which limits the frequency band of the signal passing therethrough and a switching circuit capable of switching whether the intermediate frequency signal outputted from the mixing circuit is to pass through or bypass the band-pass filter, an SAW filter which allows the intermediate frequency signal having passed through the variable filter circuit to pass therethrough, an intermediate frequency amplifier circuit for intermediate frequency amplification of the intermediate frequency signal having passed through the SAW filter, a VCO circuit which generates an oscillation signal and which can change the oscillation frequency of the oscillation signal, a detector circuit which, on the basis of the oscillation frequency of the oscillation signal, detects the intermediate frequency signal amplified by the intermediate frequency amplifier circuit and which outputs a video signal and an audio signal, and a microcomputer which, when receiving a broadcasting radio wave in voice FM broadcast, makes control to let the switching circuit switch over to the side where the intermediate frequency signal is allowed to pass through the bandpass filter circuit and for causing the VCO circuit to change the oscillation frequency of the oscillation signal into an oscillation frequency corresponding to the broadcasting radio wave in the voice FM broadcast.

According this construction, the high frequency amplifier circuit receives and amplifies a broadcasting radio wave corresponding to a desired frequency and provides an amplified output. The local oscillation circuit has a PLL circuit, whereby a local oscillation signal having a local oscillation frequency corresponding to the desired frequency of the broadcasting radio wave is produced and outputted. The mixing circuit mixes the output provided from the high frequency amplifier circuit with the local oscillation signal provided from the local oscillator circuit to make conversion into an intermediate frequency signal and outputs the intermediate frequency signal to the variable filter circuit.

The variable filter circuit causes the intermediate frequency signal to pass therethrough. The variable filter circuit has a band-pass filter circuit which limits the frequency band of the signal passing therethrough, and can change the limitation on the frequency band of the intermediate frequency signal passing therethrough. Whether the frequency band of the intermediate frequency signal is to be limited or not can be decided by changing over the switching circuit.

After the intermediate frequency signal which has passed through the variable filter circuit is allowed to pass through the SAW filter, the intermediate frequency amplifier circuit amplifies the intermediate frequency signal having passed through the SAW filter.

When the VCO circuit generates an oscillation signal, the detector circuit, on the basis of the oscillation frequency of the oscillation signal, detects the intermediate frequency signal amplified in the intermediate frequency amplifier circuit and outputs a video signal and an audio signal. The VCO circuit can change the oscillation frequency of the oscillation signal which it generates.

When receiving the broadcasting radio wave in voice FM broadcast, the microcomputer makes control to let the switching circuit switch over to the side where the intermediate frequency signal is allowed to pass through the bandpass filter circuit, and at the same time makes control to let the VCO circuit change the oscillation frequency of the oscillation signal into an oscillation frequency corresponding to the broadcasting radio wave in voice FM broadcast.

As a result, at the time of receiving the broadcasting radio wave in voice FM broadcast, a disturbance component is removed from the intermediate frequency signal and there are performed intermediate frequency amplification and detection. Thus, even without separately providing an SAW filter and a voice intermediate frequency amplifier circuit, it is possible to remove the disturbance component and perform intermediate frequency amplification and detection of the converted voice intermediate frequency signal. In this case, since it is possible to change the oscillation frequency of the oscillation signal which the VCO circuit utilizes, it is not necessary to let the pass band of the intermediate frequency signal match the oscillation frequency of the oscillation signal. Consequently, it is possible to improve the freedom of circuit design.

Thus, according to the present invention it is possible to provide a broadcast receiving system capable of improving the freedom of circuit design without the need of separately providing an SAW filter and a voice intermediate frequency amplifier circuit.

The various circuits referred to above may each be constituted by a combination of such electronic components as transistor, diode, resistor, capacitor, and coil, or by an integrated circuit of those electronic components. Various configurations are available. Now, there will be given an example of acquiring a reference oscillation signal of a predetermined oscillation frequency which is for the creation of a local oscillation signal in the local oscillator circuit. That is, in a second aspect of the present invention there is provided, in combination with the above first aspect, a broadcast receiving system wherein the high frequency amplifier circuit, the local oscillator circuit, the mixing circuit and the variable filter circuit are provided in a tuner IC which is connected to the microcomputer, the intermediate frequency amplifier circuit, the detector circuit and the VCO circuit are provided in a chroma IC which is connected not only to the microcomputer but also to the tuner IC through an SAW filter, further, a crystal oscillator circuit which generates a reference oscillation signal of a predetermined oscillation frequency and which amplifies and outputs the reference oscillation signal through an emitter follower circuit, and a series resonance circuit connected to the crystal oscillator circuit and having a resonance frequency nearly equal to the predetermined oscillation frequency of the reference oscillation signal, are provided, the VCO circuit produces the oscillation signal in accordance with the reference oscillation signal outputted from the crystal oscillator circuit, and the local oscillator circuit acquires the reference oscillation signal through the series resonance circuit and produces the local oscillation signal in accordance with the reference oscillation signal.

According to this configuration, the tuner IC connected to the microcomputer is provided with a high frequency amplifier circuit, a local oscillator circuit, a mixing circuit and a variable filter circuit. The chroma IC, which is connected to the microcomputer and also connected to the tuner IC through an SAW filter, is provided with an intermediate frequency amplifier circuit, a detector circuit and a VCO circuit. Thus, with a small number of components it is possible to constitute the broadcast receiving system. It is not necessary to separately provide an SAW filter and a voice intermediate frequency amplifier circuit.

The VCO circuit generates an oscillation signal in accordance with the reference oscillation signal of a predetermined oscillation frequency generated by the crystal oscillator circuit. The local oscillator circuit also generates a local oscillation signal in accordance with the reference oscillation signal generated by the crystal oscillator circuit. That is, it is no longer required to use a crystal oscillator circuit exclusive for the local oscillator circuit and hence it becomes possible to reduce the number of crystal oscillator used.

Since the series resonance circuit connected to the crystal oscillator circuit resonates the reference oscillation signal at a resonance frequency of the reference oscillation frequency, attenuation of the reference oscillation signal is prevented. Thus, the local oscillator circuit can acquire an unattenuated reference oscillation signal. The reference oscillation signal is amplified by the emitter follower circuit and there is provided an output of low impedance, whereby the influence of a mixed electrical noise can be diminished. Therefore, even when the distance from the crystal oscillator circuit is long and so is a signal line of the reference oscillation signal, the local oscillator circuit can utilize the reference oscillation signal provided from the crystal oscillator circuit.

Thus, in this configuration it becomes unnecessary to use a crystal oscillator circuit exclusive for the local oscillator circuit and hence becomes possible to reduce the number of crystal oscillator used. In this connection, even if the distance from the crystal oscillator circuit is long and so is a signal line of the reference oscillation signal, it is possible for the local oscillator circuit to utilize the reference oscillation signal provided from the crystal oscillator circuit.

The present invention is also applicable to other configurations than the above circuit configurations. More particularly, in a third aspect of the present invention there is provided a broadcast receiving system comprising a tuner means which receives a broadcasting radio wave corresponding to a desired frequency and which converts it into an intermediate frequency signal and outputs the intermediate frequency signal, a variable filter means which allows the intermediate frequency signal outputted from the tuner means to pass therethrough and which can change a limitation on the frequency band of the intermediate frequency signal passing therethrough, a variable oscillator means which generates an oscillation signal and which can change the oscillation frequency of the oscillation signal, an amplifier/detector means which, in accordance with the oscillation frequency of the oscillation signal, subjects the intermediate frequency signal having passed through the variable filter means to intermediate frequency amplification and detection and which outputs a video signal and an audio signal, and a control means which, in accordance with the type of the received broadcasting radio wave, makes control to let the variable filter means limit the frequency band of the intermediate frequency signal passing therethrough and let the variable oscillator means change the oscillation frequency of the oscillation signal.

According to this configuration, when the tuner means receives the broadcasting radio wave corresponding to the desired frequency, then converts it into an intermediate frequency signal and outputs the intermediate frequency signal, the variable filter means allows the intermediate frequency signal to pass therethrough. At this time, it is possible to change the limitation on the frequency band of the passing intermediate frequency signal.

When the variable oscillator means generates an oscillation signal, the amplifier/detector means subjects the intermediate frequency signal having passed through the variable filter to intermediate frequency amplification and detection in accordance with the oscillation frequency of the oscillation signal and outputs a video signal and an audio signal. The variable oscillator means can change the oscillation frequency of the oscillation signal which is generated.

In accordance with the type of the received broadcasting radio wave the control means makes control to let the variable filter means limit the frequency band of the intermediate frequency signal passing therethrough and at the same time makes control to let the variable oscillator means change the oscillation frequency of the oscillation signal.

Therefore, in the case of receiving a broadcasting radio wave for which it is necessary to limit the frequency band of the intermediate frequency signal, if the intermediate frequency signal is limited by the variable filter means to the frequency band matching the type of the broadcasting radio wave and the oscillation frequency of the oscillation signal is changed by the variable oscillator means and further if the intermediate frequency signal having passed through the variable filter means is amplified by the amplifier/detector means, a disturbance component is removed from the intermediate frequency signal and there are performed intermediate frequency amplification and detection. That is, even without separate provision of a filter and an intermediate frequency amplifier circuit, the converted intermediate frequency signal after the removal of a disturbance component can be subjected to intermediate frequency amplification and detection. At this time, since it is possible to change the oscillation frequency of the oscillation signal which the amplifier/detector means utilizes, it is not necessary to let the pass band of the intermediate frequency signal match the oscillation frequency of the oscillation signal. Consequently, it is possible to improve the freedom of circuit design.

Thus, it is possible to provide a broadcast receiving system which does not require separate provision of a filter and an intermediate frequency amplifier circuit and which permits improving the freedom of circuit design.

As an example of the above control, in a fourth aspect of the present invention there is provided, in combination with the above third aspect, a broadcast receiving system wherein when receiving a broadcasting radio wave in voice FM broadcast, the control means makes control to let the variable filter means limit the frequency band and let the variable oscillator means change the oscillation frequency of the oscillation signal into an oscillation frequency corresponding to the broadcasting radio wave in voice FM broadcast.

According to this configuration, when receiving the broadcasting radio wave in voice FM broadcast, the frequency band of the intermediate frequency signal passing through the variable filter means is limited and the oscillation frequency of the oscillation signal changes to an oscillation frequency corresponding to the broadcasting radio wave in voice FM broadcast. That is, an example of the control means can be provided. This example is suitable for receiving the broadcasting radio wave in voice FM broadcast by utilizing the broadcast receiving system in television.

Of course, various types of broadcasting radio waves are conceivable wherein the frequency band of an intermediate frequency signal is limited. For example, the present invention may be applied to receiving a broadcasting radio wave in voice AM broadcast.

By so doing, it is possible to provide an example of the control means.

The variable filter means which allows the intermediate frequency signal outputted from the tuner means to pass therethrough may be configured variously insofar as it can change the limitation on the frequency band of the passing intermediate frequency signal. As an example thereof, in a fifth aspect of the present invention there is provided, in combination with the above third aspect, a broadcast receiving system wherein the variable filter means is provided with a band-pass filter circuit which limits the frequency band of a signal passing therethrough and a switching circuit capable of switching whether the intermediate frequency signal is to pass through or bypass the band-pass filter circuit, and the control means makes control to let the switching circuit switch whether the intermediate frequency signal is to pass through or bypass the band-pass filter circuit, in accordance with the type of the received broadcasting radio wave.

According to this configuration, by making control to switch the switching circuit, it becomes possible for the control means to make control whether the frequency band of the intermediate frequency signal is to be limited or not. That is, the variable filter means is constituted by both the band-pass filter circuit and the switching circuit.

In this way the variable filter means can be fabricated from both the band-pass filter circuit and the switching circuit.

As an example of configuration wherein a broadcasting radio wave in voice FM broadcast is received by utilizing the variable filter means described above, in a sixth aspect of the present invention there is provided, in combination with the above fifth aspect, a broadcast receiving system wherein, when receiving a broadcasting radio wave in voice FM broadcast, the control means makes control to let the switching circuit switch the intermediate frequency signal to the side where the signal is allowed to pass through the band-pass filter circuit.

According to this configuration, when receiving the broadcasting radio wave in voice FM broadcast, the intermediate frequency signal passes through the band-pass filter circuit, so that the frequency band of the intermediate frequency signal can be limited. That is, it is possible to provide an example of controlling the switching operation of the switching circuit.

The tuner means may be configured variously insofar as it can receive a broadcasting radio wave corresponding to a desired frequency and is capable of converting it into an intermediate frequency signal and outputting it. As an example thereof, in a seventh aspect of the present invention there is provided, in combination with the above third aspect, a broadcast receiving system wherein the tuner means is provided with a local oscillator means which produces and outputs in a PLL circuit a local oscillation signal of a local oscillation frequency corresponding to a desired frequency of the broadcasting radio wave and is also provided with a mixing circuit which amplifies the inputted broadcasting radio wave and which mixes the thus-amplified signal with the local oscillation signal outputted from the local oscillator means to make conversion into an intermediate frequency signal, the mixing circuit then outputting the intermediate frequency signal to the variable filter means.

According to this configuration, the local oscillation means has a PLL circuit, whereby a local oscillation signal of a local oscillation frequency corresponding to the desired frequency of the received broadcasting radio wave is produced and outputted. The mixing means amplifies the inputted broadcasting radio wave, mixes the amplified signal with the local oscillation signal outputted from the local oscillator means to make conversion into an intermediate frequency signal and then outputs the intermediate frequency signal to the variable filter means. That is, the tuner means is constituted by both the local oscillator means and the mixing means.

The frequency of the converted intermediate frequency signal is the difference or sum between the local oscillation frequency and the frequency of the signal amplified from the broadcasting radio wave. Therefore, by controlling the local oscillation frequency of the local oscillation signal it is possible to determine the frequency of the intermediate frequency signal.

The various means described above may be constituted by a combined circuit of electronic components including transistor or by utilizing an integrated circuit of those electronic components. Various configurations are available. As an example thereof, in an eighth aspect of the present invention there is provided, in combination with the above seventh aspect, a broadcast receiving system wherein the tuner means and the variable filter means are provided in a tuner IC, the amplifier/detector means and the variable oscillator means are provided in a chroma IC which is connected to the tuner IC through an SAW filter, and the control means is provided in a microcomputer which is connected to both the tuner IC and the chroma IC.

According to this configuration, the tuner IC is provided with the tuner means and the variable filter means, the chroma IC connected to the tuner IC through an SAW filter is provided with the amplifier/detector means and the variable oscillator means, and the microcomputer connected to both the tuner IC and the chroma IC is provided with the control means. That is, the broadcast receiving system in question can be constituted with use of a reduced number of components. In this case, it is not necessary to separately provide a filter and an intermediate frequency amplifier circuit.

As an example of acquiring a reference oscillation signal of a predetermined oscillation frequency which is used for the local oscillator means to produce a local oscillation signal, in a ninth aspect of the present invention there is provided, in combination with the above seventh aspect, a broadcast receiving system wherein there is provided a crystal oscillator circuit for generating a reference oscillation signal of a predetermined oscillation frequency, the variable oscillator means produces the oscillation signal in accordance with the reference oscillation signal provided from the crystal oscillator circuit, and the local oscillator means produces the local oscillation signal in accordance with the reference oscillation signal.

According to this configuration, the variable oscillator means produces an oscillation signal in accordance with the reference oscillation signal of the predetermined oscillation frequency provided from the crystal oscillator circuit. Also as to the local oscillator means, it produces a local oscillation signal in accordance with the reference oscillation signal provided from the crystal oscillator circuit. That is, it is not necessary to use a crystal oscillator circuit exclusive for the local oscillator means and hence it is possible to reduce the number of crystal oscillator used. Even when the oscillation frequency of the reference oscillation signal which the local oscillator means utilizes changes, this can be coped with by a corrective calculation which is performed by the control means.

Of course, the configuration wherein the local oscillator means also utilizes the reference oscillation signal which the variable oscillator means utilizes, is a mere example. If there is provided a crystal oscillator circuit not connected to the variable oscillator means, there may be utilized a reference oscillation signal produced by the crystal oscillator circuit. It is also possible to utilize a reference oscillation signal generated by a crystal oscillator circuit which is exclusive for the local oscillator means, because the resulting demerit is a mere incapability of reducing the number of crystal oscillator. The local oscillator means can acquire reference oscillation signals from various crystal oscillator circuits.

As an example of the configuration wherein the local oscillator means acquires a reference oscillation signal, in a tenth aspect of the present invention there is provided, in combination with the above ninth aspect, a broadcast receiving system wherein there is provided a resonance circuit which is connected to the crystal oscillator circuit and whose resonance frequency is almost equal to the predetermined oscillation frequency of the reference oscillation signal, and the local oscillator means acquires the reference oscillation signal through the resonance circuit.

According to this configuration, it is possible to prevent attenuation of the reference oscillation signal because the resonance circuit connected to the crystal oscillator circuit resonates the reference oscillation signal with a resonance frequency of the reference oscillation frequency. Consequently, the local oscillator means can acquire a reference oscillation signal which is not attenuated. Accordingly, even when the distance from the crystal oscillator circuit is long and so is a signal line of the reference oscillation signal, the local oscillator means can utilize the reference oscillation signal provided from the crystal oscillator circuit.

Various configurations are available for the resonance circuit insofar as the resonance frequency is almost equal to the predetermined oscillation frequency of the reference oscillation signal. For example, it is possible to utilize a series resonance circuit of coil and capacitor.

As an example of the configuration wherein the crystal oscillator circuit outputs the reference oscillation signal, in an eleventh aspect of the present invention there is provided, in combination with the above ninth aspect, a broadcast receiving system wherein the crystal oscillator circuit is provided with an emitter follower circuit which amplifies the reference oscillation signal and which outputs the thus-amplified signal.

According to this configuration, the reference oscillation signal is amplified by the emitted follower circuit. At this time, the output of the reference oscillation signal becomes low in impedance, so that it is possible to diminish a mixed electrical noise, and even if a signal line of the reference oscillation signal is long, the local oscillator means can utilize the reference oscillation signal provided from the crystal oscillator circuit.

Of course, the above technique is not limited to its application to a substantial system, but is also effective as a method thereof. In a twelfth aspect of the present invention there is provided a broadcast receiving method comprising receiving a broadcasting radio wave corresponding to a desired frequency and converting it into an intermediate frequency signal by means of a tuner, allowing the intermediate frequency signal to pass through a variable filter which can change a limitation on the frequency band of the signal passing therethrough, subjecting the intermediate frequency signal having passed through the variable filter to intermediate frequency amplification and simultaneous detection in accordance with an oscillation frequency provided from a variable oscillator which can change the oscillation frequency of an oscillation signal, and outputting a video signal and an audio signal, wherein according to the type of the received broadcasting radio wave there is made control to limit the frequency band of the intermediate frequency signal passing through the variable filter and let the variable oscillator change the oscillation frequency of the oscillation signal.

The concept of the invention is not limited to the above, but includes various modes. In some case such a broadcast receiving system exists alone or in another case it is utilized in an incorporated state into a certain apparatus. Thus, a change may be made appropriately between software and hardware.

In the case where an embodied example of the invention concept is software, it is inevitably considered that the invention concept exists and is utilized also on a recording medium which stores the software.

Therefore, in a thirteenth aspect of the present invention there is provided a medium storing a broadcast reception control program, the broadcast reception control program being used in receiving a broadcasting radio wave corresponding to a desired frequency, converting it into an intermediate frequency signal by means of a tuner, allowing the intermediate frequency signal to pass through a variable filter which can change a limitation on the frequency band of the signal passing therethrough, subjecting the intermediate frequency signal having passed through the variable filter to intermediate frequency amplification and simultaneous detection in accordance with an oscillation frequency provided from a variable oscillator which can change the oscillation frequency of an oscillation signal, and outputting a video signal and an audio signal, wherein a computer is allowed to implement a function of making control to let the variable filter limit the frequency band of the intermediate frequency signal passing therethrough and let the variable oscillator change the oscillation frequency of the oscillation signal.

Of course, the above storage medium may be a magnetic storage medium or a magneto-optic storage medium. Just the same thinking is also applicable to all of storage mediums to be developed in future. This is completely true of duplicating stages, including primary and secondary duplicate products.

The concept of the invention is further applicable in just the same manner to the case where the invention is implemented partially by software and partially by hardware. The invention may be implemented in a mode such that the program is partially stored on the storage medium and is read as necessary. It goes without saying that the invention concept is reflected rather in the program itself.

DESCRIPTION OF THE PREFERRED EMBODIMENT

An embodiment of the present invention will be described hereinunder with reference to the drawings.

Figure 1:
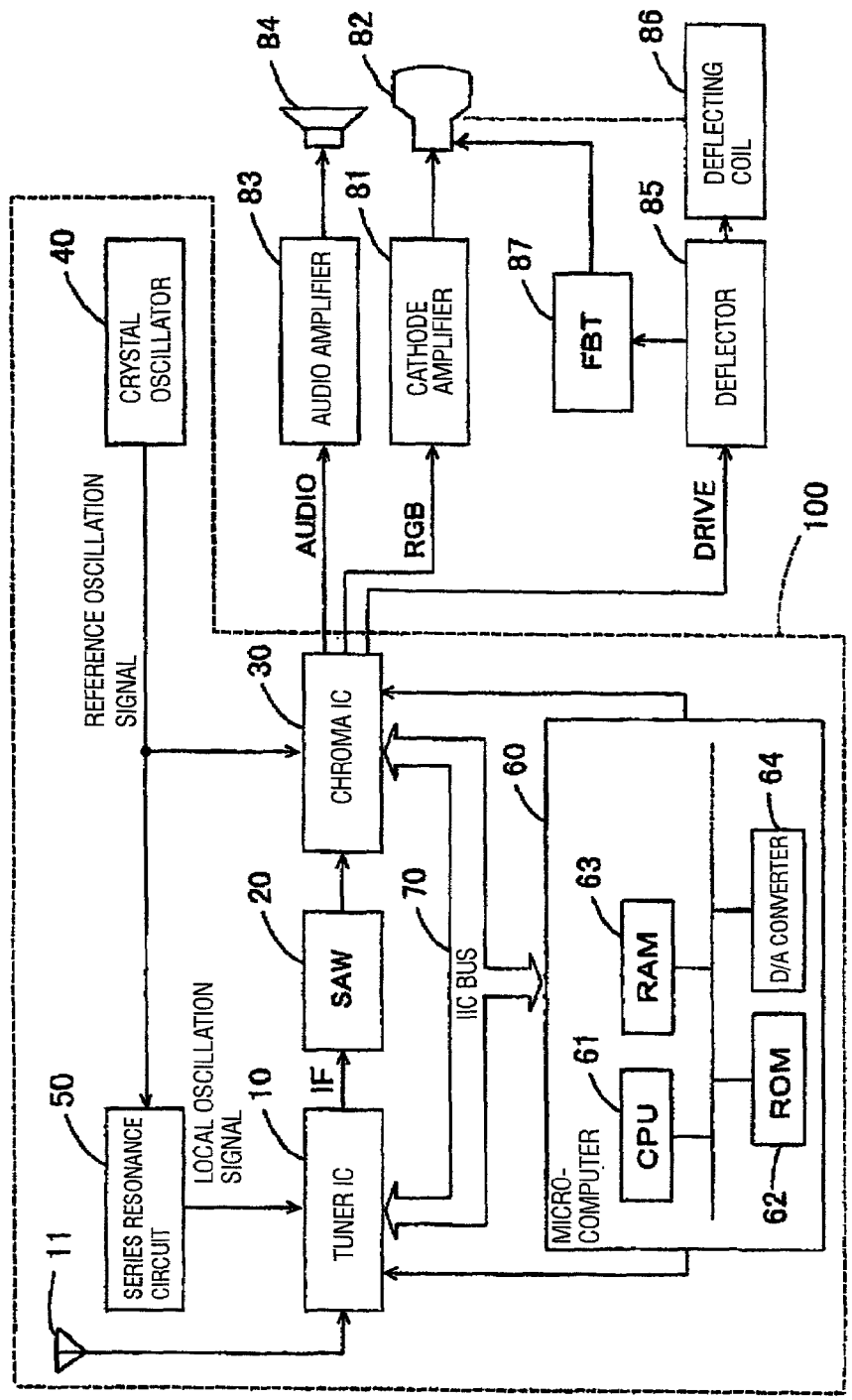
FIG. 1 is a block diagram showing schematically the configuration of a combined voice FM broadcast receiver and television to which is applied a broadcast receiving system according to an embodiment of the present invention.

FIG. 1 illustrates in terms of a block diagram a schematic configuration of a combined voice FM broadcast receiver and television to which is applied a broadcast receiving system 100 according to an embodiment of the present invention. An operation panel and a remote controller to be used by a user are not shown in the same figure.

In FIG. 1, the broadcast receiving system 100 is roughly composed of a tuner IC 10, a SAW (Surface Acoustic Wave) filter 20 connected to the tuner IC 10, a chroma IC 30 connected to the SAW filter 20, a crystal oscillator circuit 40 connected to the chroma IC 30, a series resonance circuit 50 connected to both crystal oscillator circuit 40 and tuner IC 10, and a microcomputer 60 connected to both tuner IC 10 and chroma IC 30. The tuner IC 10, chroma IC 30 and microcomputer 60 are connected to an IIC bus 70. The microcomputer 60 controls the entire television by serial data communication, thereby implementing the function as a combined voice FM broadcast receiver and television.

Figure 2:
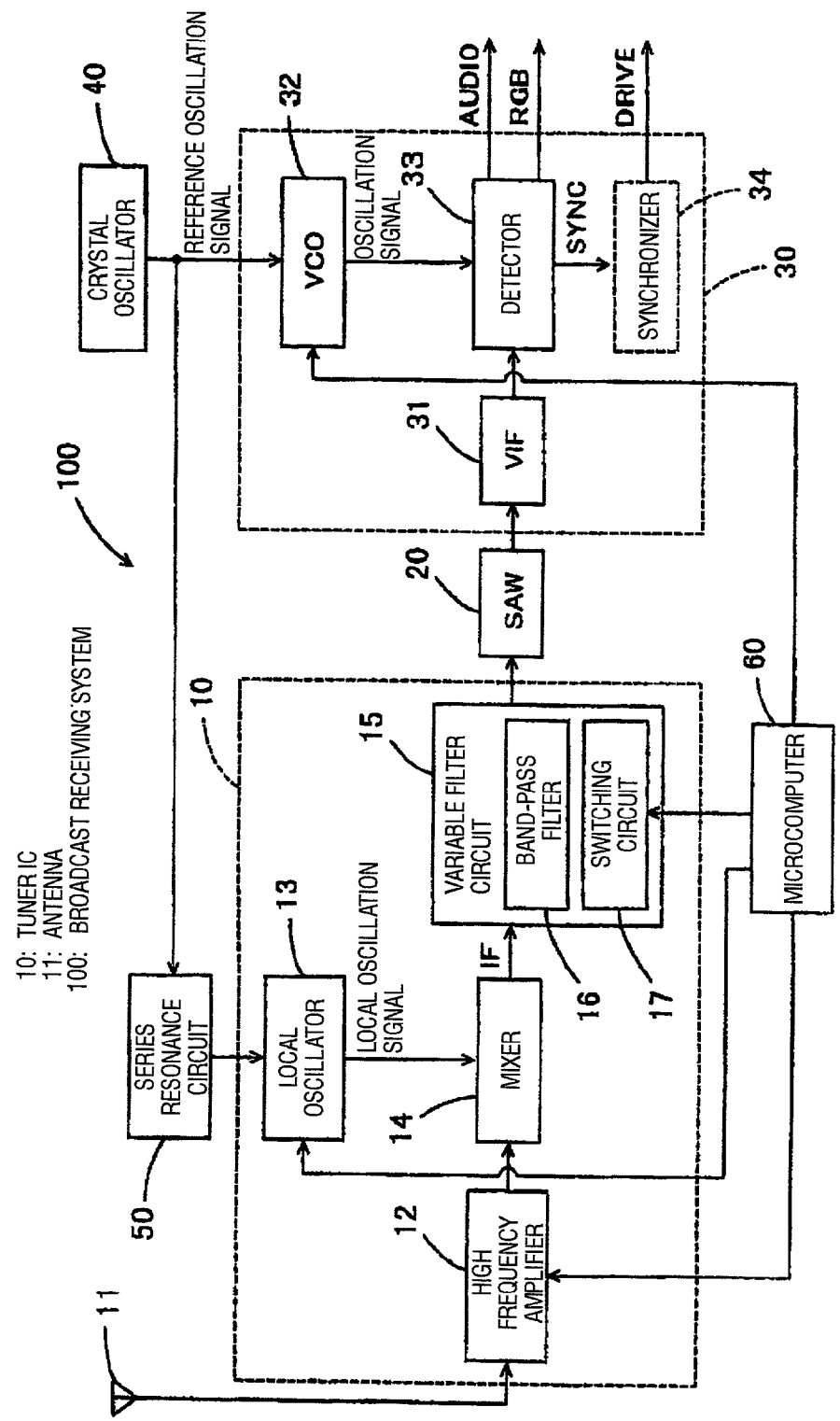
FIG. 2 is a block diagram showing the configuration of the broadcast receiving system.

FIG. 2 is a block diagram showing the configuration of the broadcast receiving system 100, in which the IIC bus 70 is not shown.

The tuner IC 10, which is a frequency synthesizer type tuner, receives a radio wave in television broadcast or voice FM broadcast, then converts it into an intermediate frequency signal and outputs the intermediate frequency signal, under control of the microcomputer 60.

In FIG. 2, the tuner IC 10 is provided with a high frequency amplifier circuit 12 connected to both antenna 11 and microcomputer 60, a local oscillator circuit 13 connected to both series resonance circuit 50 and microcomputer 60, a mixing circuit 14 connected to both local oscillator circuit 13 and high frequency amplifier circuit 12, and a variable filter circuit 15 connected to all of mixing circuit 14, SAW filter 20 and microcomputer 60. The variable filter circuit 15 has a band-pass filter circuit 16 and a switching circuit 17, the switching circuit 17 being connected to the microcomputer 60 located outside.

The high frequency amplifier circuit 12, local oscillator circuit 13 and mixing circuit 14 may be any of various circuits for television which have been adopted heretofore.

The high frequency amplifier circuit 12 has a band30 pass filter (not shown) and, under control of the microcomputer 60, receives a broadcasting radio wave corresponding to a desired frequency from the antenna 11 through the band-pass filter and amplifies it into a high frequency signal. The frequency of this high frequency signal is the same as that of the broadcasting radio wave in a selected channel. The high frequency amplifier circuit outputs the high frequency signal to the mixing circuit 14.

Figure 3:
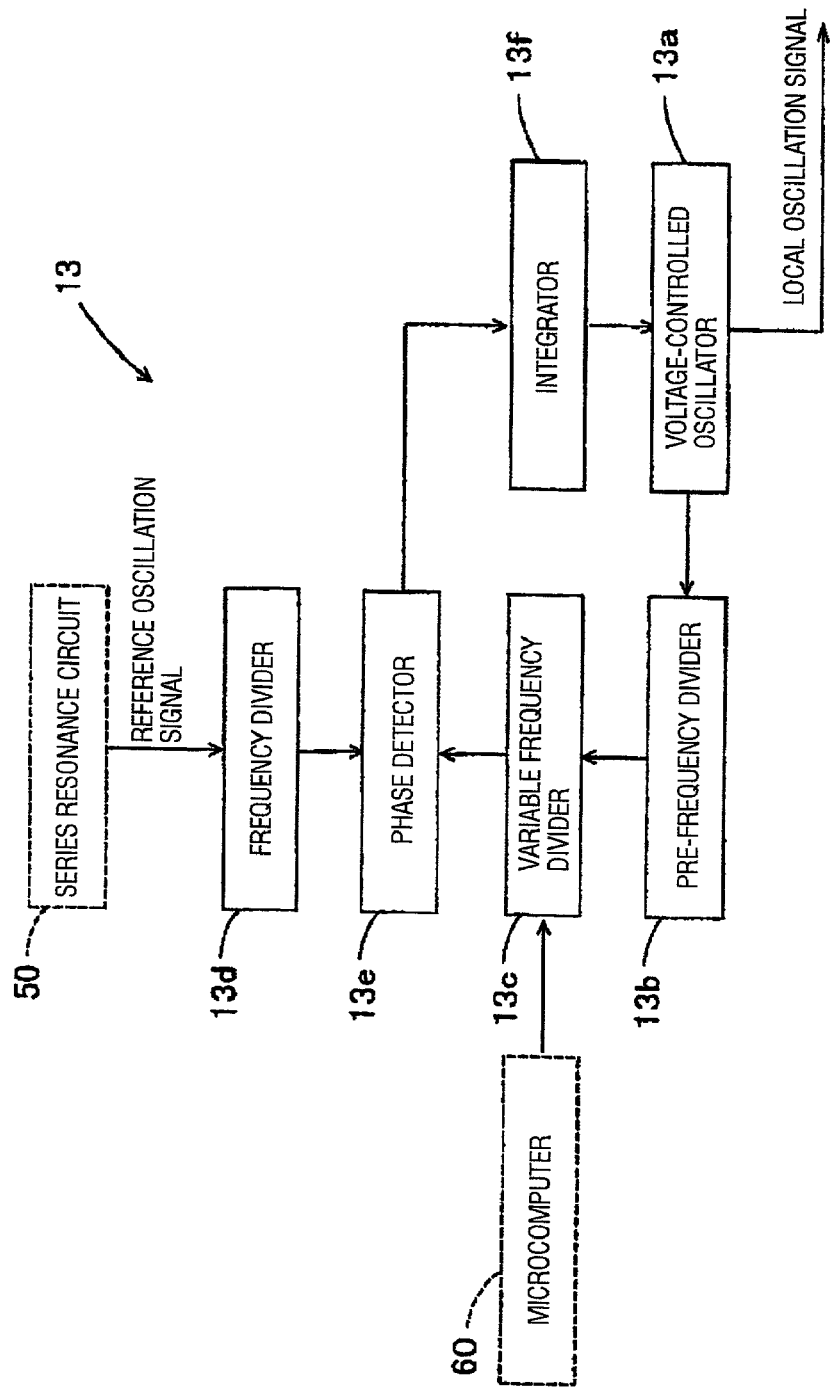
FIG. 3 is a block diagram showing the configuration of a local oscillator circuit.

As shown in FIG. 3, the local oscillator circuit 13 is constituted by a PLL (Phase Locked Loop) circuit. With the PLL circuit, a local oscillation signal of a local oscillation frequency corresponding to the desired frequency of the broadcasting radio wave is produced and outputted to the mixing circuit 14. That is, the local oscillator circuit 13 constitutes the local oscillator means as referred to herein. In the figure, the series resonance circuit 50 and the microcomputer 60 are indicated by dotted lines.

In FIG. 3, a local oscillation signal outputted from a voltage-controlled oscillator 13a is inputted to a pre-frequency divider 13b which is set to a predetermined frequency dividing ratio, and is frequency-divided, then is further inputted to a variable frequency divider 13c and is frequency-divided. The microcomputer 60 controls the frequency dividing ratio of the variable frequency divider 13c so as to give a local oscillation frequency corresponding to the desired frequency which is received. On the other hand, a reference oscillation signal is fed from the series resonance circuit 50 to a frequency divider 13d which is set to a predetermined frequency dividing ratio, and is frequency-divided. The thus frequency-divided local oscillation signal and reference oscillation signal are inputted to a phase detector 13e, from which a detection output as a result of frequency comparison is fed to an integrating circuit 13f. From the integrating circuit 13f is provided a voltage output which varies depending on the detection output. This voltage output is fed to the voltage-controlled oscillator 13a and the frequency of the local oscillation signal is made coincident with the local oscillation frequency corresponding to the desired frequency.

The local oscillation frequency differs according to countries. For example, in the case of receiving television broadcast in the U.S., a local oscillation frequency is set 45.75 MHz higher than the frequency of the high frequency signal outputted from the high frequency amplifier circuit 12. In the case of receiving television broadcast in Japan, a local oscillation frequency is 58.75 MHz higher than the frequency of the high frequency signal.

The mixing circuit 14 mixes the output from the high frequency amplifier circuit 12 with the local oscillation signal provided from the local oscillator circuit 13 to make conversion into an intermediate frequency signal and outputs the intermediate frequency signal to the variable filter circuit 15. That is, the high frequency amplifier circuit 12 and the mixing circuit 14 constitute the mixing means as referred to in the present invention.

The frequency of the intermediate frequency signal corresponds to the local oscillation frequency of the local oscillation signal minus the frequency of the high frequency signal. For example, in the case of setting for reception of television broadcast in the U.S., the frequency of the intermediate frequency signal is 45.75 MHz. In the U.S. television broadcast, the frequency of a voice component in the intermediate frequency signal is set at 41.25 MHz.

Thus, the high frequency amplifier circuit 12, local oscillator circuit 13 and mixing circuit 14, which receive a broadcasting radio wave corresponding to a desired frequency, make conversion into an intermediate frequency signal and output the intermediate frequency signal, constitute the tuner means as referred to in the present invention.

Figure 4:
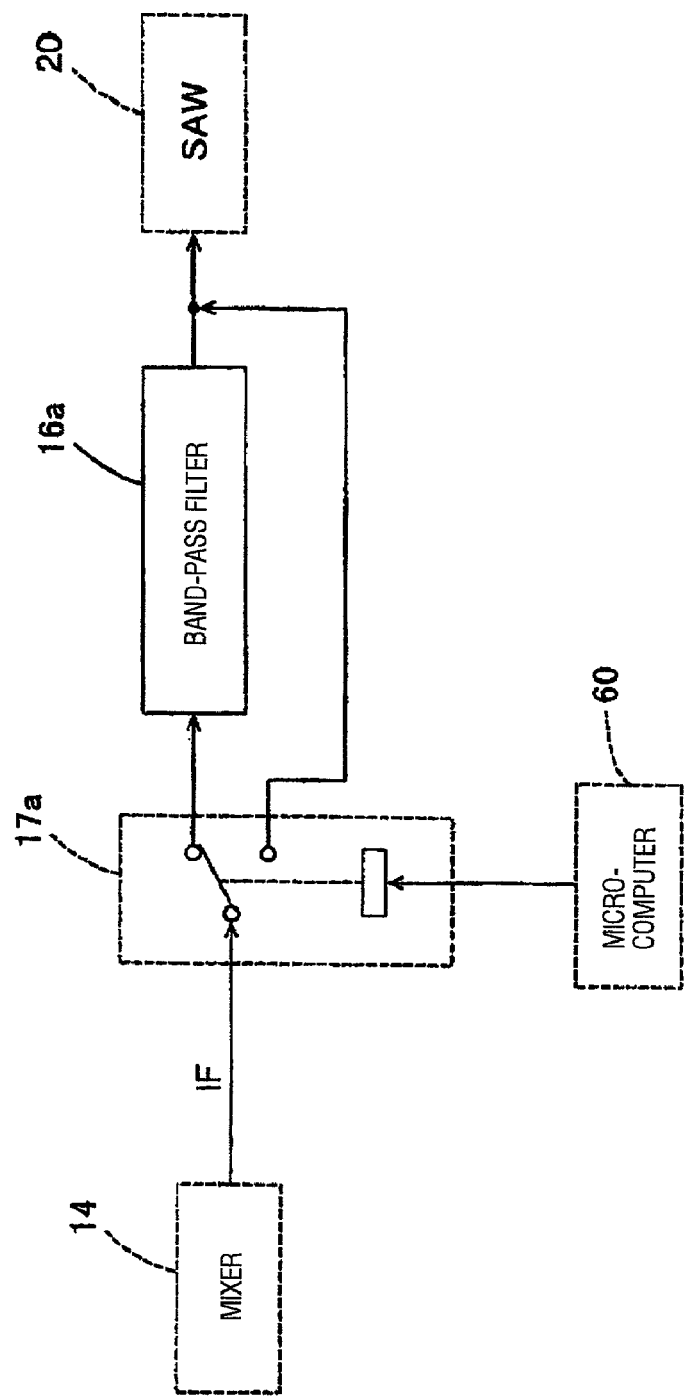
FIG. 4 is a block diagram showing the configuration of a variable filter circuit.

As shown in FIG. 4, the variable filter circuit 15 has a band-pass filter 16a which constitutes the band-pass filter circuit 16 and a switch 17a which constitutes the switching circuit 17, and allows the intermediate frequency signal outputted from the mixing circuit 14 to pass therethrough. In the same figure, the mixing circuit 14, SAW filter 20 and microcomputer 60 are indicated by dotted lines.

In FIG. 4, the band-pass filter 16a is of a narrow band and limits the frequency band of the intermediate frequency signal passing therethrough. For example, in the case where the band-pass filter 16a has a frequency passing characteristic of 42.0±1.0 MHz, a component smaller than 41.0 MHz and a component larger than 43.0 MHz in the intermediate frequency signal passing through the band-pass filter 16a are cut off. The frequency band limited by the band-pass filter 16a is included in the frequency band limited by the SAW filter 20.

If the switch 17a is not incorporated into the tuner IC 10, it can be constituted, for example, by combination with a switching transistor. In accordance with a signal of high or low voltage level outputted from the microcomputer 60 the switch 17a can switch whether the intermediate frequency signal outputted from the mixing circuit 14 is to pass through or bypass the band-pass filter 16a.

The variable filter circuit 15 which can thus allow the intermediate frequency signal provided from the mixing circuit 14 to pass therethrough and which can change the limitation on the frequency band of the intermediate frequency signal passing therethrough, constitutes the variable filter means as referred to in the present invention.

The SAW filter 20 is a band-pass filter of a wide band which allows the intermediate frequency signal having passed through the variable filter circuit 15 to pass therethrough. The SAW filter 20 has a comb-shaped electrode formed on a piezoelectric substrate, whereby when the intermediate frequency signal moves through the comb-shaped electrode, the component outside the predetermined frequency band is eliminated. Consequently, as the intermediate frequency signal passes through the SAW filter 20, a disturbance component outside the predetermined frequency band is eliminated.

Of course, instead of the SAW filter 20 there may be used any of various band-pass filter circuits so far adopted as circuits for television.

The chroma IC 30 is provided with an intermediate frequency amplifier (VIF) circuit 31 connected to the SAW filter 20, a VCO (Voltage Controlled Oscillator) circuit 32 connected to both crystal oscillator circuit 40 and microcomputer 60, a detector circuit 33 connected to both VCO circuit 32 and VIF circuit 31, and a synchronizing circuit 34 connected to the detector circuit 33. It suffices for the broadcast receiving system 100 according to the present invention to permit the generation of both video (RGB) signal and audio (AUDIO) signal from the inputted broadcasting radio wave, but in this embodiment the synchronizing circuit 34 is also provided in the chroma IC 30 for the purpose of reducing the number of components used as a whole of television.

As the VIF circuit 31, VCO circuit 32, detector circuit 33 and synchronizing circuit 34 there may be used any of various conventional circuits for television.

The VIF circuit 31 subjects the intermediate frequency signal having passed through the SAW filter 20 to intermediate frequency amplification. The thus-amplified intermediate frequency signal is then inputted to the detector circuit 33.

The VCO circuit 32 can change the oscillation frequency of an oscillation signal which is generated in accordance with an inputted voltage. The VCO circuit 32 generates an oscillation signal at an oscillation frequency corresponding to the voltage. The microcomputer 60 controls the voltage inputted to the VCO circuit 32 so as to give an oscillation frequency corresponding to the type of the received broadcasting radio wave. That is, the oscillation frequency of the oscillation signal is changed in accordance with the type of the received broadcasting radio wave.

For example, in the case of receiving television broadcast in the U.S., the oscillation frequency of an oscillation signal is set at 45.75 MHz which is equal to the foregoing difference between the local oscillation frequency and the frequency of a high frequency signal. In the case of receiving voice FM broadcast in the U.S., the oscillation frequency of an oscillation signal is determined to be a frequency which is 4.5 MHz larger than the frequency of the intermediate frequency signal produced in the mixing circuit 14. As an example, when the frequency of the intermediate frequency signal is 42.0 MHZ, the oscillation frequency of the oscillation signal is 42.0+4.5=46.5 MHz.

The VCO circuit 32 which thus generates an oscillation signal and which can change the oscillation frequency of the oscillation signal, constitutes the variable oscillator means as referred to in the present invention.

In accordance with the oscillation frequency of the oscillation signal the detector circuit 33 detects the intermediate frequency signal amplified in the VIF circuit 31 and outputs both RGB signal and an AUDIO signal. More specifically, the detector circuit 33 performs video detection from the amplified intermediate frequency signal while synchronizing to the oscillation frequency of the oscillation signal, separates RGB signal by performing a predetermined color demodulation and outputs it to the exterior. As to the audio signal, the detector circuit 33 mixes a voice component contained in the amplified intermediate frequency signal with the oscillation signal to afford a second voice intermediate frequency signal, obtains an AUDIO signal by FM detection and outputs it to the exterior. The frequency of the second voice intermediate frequency signal corresponds to the oscillation frequency of the oscillation signal minus the frequency of the voice component contained in the intermediate frequency signal. For example, in the case of receiving television broadcast in the U.S., the frequency of the second voice intermediate frequency signal is 45.75−41.25=4.5 MHz, assuming that the frequency of a voice component contained in an intermediate frequency signal in the television broadcast is 41.25 MHz and the oscillation frequency is 45.75 MHz.

The VIF circuit 31 and the detector circuit 33, which thus subject the intermediate frequency signal having passed through the variable filter circuit 15 to intermediate frequency amplification in accordance with the oscillation frequency of the oscillation signal, detect the amplified intermediate frequency signal and output both video signal and audio signal, constitute the amplifier/detector means as referred to in the present invention.

In the course of detection the detector circuit 33 also generates a horizontal/vertical synchronizing signal (SYNC) in accordance with the oscillation frequency of the oscillation signal and outputs it to the synchronizing circuit 34.

Thereafter, the RGB signal outputted from the detector circuit 33 is fed to a cathode amplifier 81, in which it is amplified. The thus-amplified RGB signal is fed to a picture tube (CRT) 82, which in turn makes image display in accordance with the amplified RGB signal. On the other hand, the AUDIO signal is outputted to an audio amplifier 83, in which it is amplified. The thus-amplified AUDIO signal is then fed to a speaker 84, which in turn outputs a voice in accordance with the amplified AUDIO signal.

The synchronizing signal 34 produces a sawtooth-like horizontal/vertical drive signal (DRIVE) in accordance with the inputted horizontal/vertical synchronizing signal and outputs the DRIVE signal to a deflector circuit 85 which comprises a horizontal deflector circuit and a vertical deflector circuit.

The deflector circuit 85 produces a predetermined horizontal/vertical drive current corresponding to the horizontal/vertical drive signal and provides it to a deflecting coil 86 attached to the picture tube 82, thereby driving an electron beam in both horizontal and vertical directions. A high frequency signal produced in the horizontal deflector circuit is fed to a fly-back transformer (FBT) 87, in which is generated a high voltage to be fed to the picture tube 82.

As a result, in the picture tube 82, an electron beam corresponding to the RGB signal is released while being driven and there appears an image on the surface of the picture tube 82.

The crystal oscillator circuit 40 generates a reference oscillation signal of a predetermined oscillation frequency and outputs it to the VCO circuit 32 and also to the local oscillator circuit 13 through the series resonance circuit 50. In the case of television broadcast of NTSC type, the reference oscillation frequency is set at 3.58 MHz, while in the case of television broadcast of PAL type, the reference oscillation frequency is set at 4.43 MHz.

By thus providing the reference oscillation signal outputted to the VCO circuit 32 also to the local oscillation circuit 13, it becomes unnecessary to use a crystal oscillator circuit exclusive for the local oscillator circuit and hence it becomes possible to reduce the number of crystal oscillator used. In the case where the reference oscillation frequency is different from that in the prior art provided with a crystal oscillator circuit exclusive for the local oscillator circuit, the microcomputer 60 can control the local oscillator circuit 13 in the same way as in the prior art by changing a control value for controlling the local oscillator circuit 13 which value is stored in a ROM 62 incorporated in the microcomputer 60. Of course, the conventional control value may be left as it is and the local oscillator circuit 13 may be controlled by multiplying the control value by a predetermined correction coefficient.

A signal line of the reference oscillation signal extending from the crystal oscillator circuit 40 up to the local oscillator circuit 13 is longer than that in the prior art provided with a crystal oscillator circuit exclusive for the local oscillator circuit. For this reason, the series resonance circuit 50 is inserted in the signal line and an emitter follower circuit is provided within the crystal oscillator circuit 40.

Figure 5:
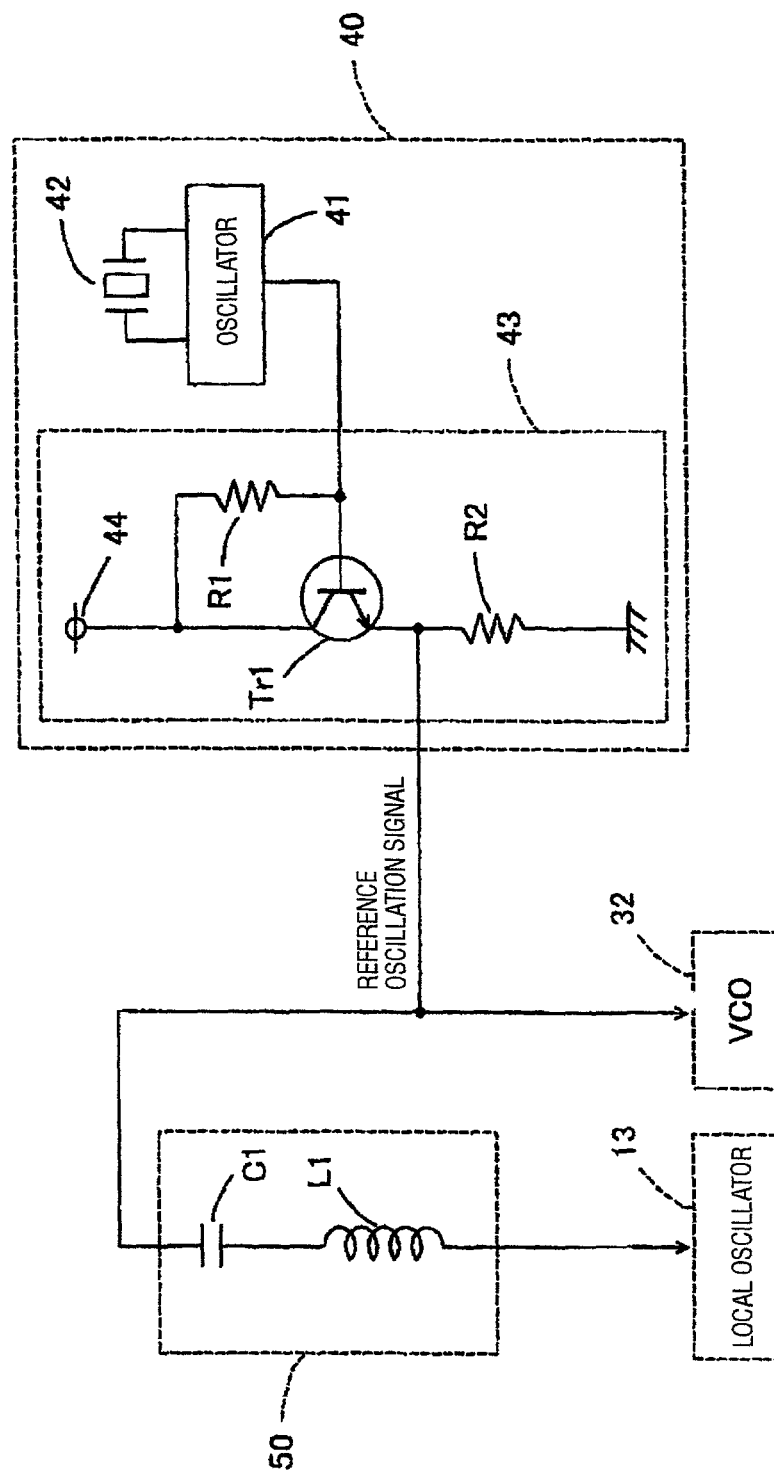
FIG. 5 is a circuit diagram showing schematically a crystal oscillator circuit and a series resonance circuit.

FIG. 5 shows the crystal oscillator circuit 40 and the series resonance circuit 50 schematically, in which the local oscillator circuit 13 and the VCO circuit 32 are indicated with dotted lines.

In the same figure, the crystal oscillator circuit 40 is made up of an oscillator circuit 41, a crystal oscillator 42 connected at both ends to the oscillator circuit 41, and an emitter follower circuit 43 connected to the oscillator circuit 41. As the crystal oscillator 42 there is used such a crystal oscillator as affords an oscillation frequency of 3.58 MHz, for example, in the case of receiving television broadcast of NTSC type.

The emitter following circuit 43 has an npn type transistor Tr1 and two resistors R1, R2. The base of the transistor Tr1 is connected to the oscillator circuit 41, the collector thereof is connected to a power line 44, and the emitter thereof is connected to both series resonance circuit 50 and VCO circuit 32. The resistor R1 is connected between the base of the transistor Tr1 and the power line 44. The resistor R2 is connected between the emitter of the transistor Tr1 and the ground. More specifically, the emitter of the transistor Tr1 is connected to ground through the resistor R2 and is conducted as a low impedance output to the signal line of the reference oscillation signal.

The reference oscillation signal is conducted to the series resonance circuit 50 which is the resonance circuit as referred to in the present invention. The series resonance circuit 50, which is disposed near the local oscillator circuit 13, comprises a coil L1 and a capacitor C1, the coil L1 and the capacitor C1 being connected in series with each other and incorporated within a shielding case. A resonance frequency, which is determined by the inductance of the coil L1 and the capacitance of the capacitor C1, is set so as to be approximately equal to the reference oscillation frequency. In the case of receiving television broadcast of NTSC type, the resonance frequency is set at 3.58 MHz.

With the above configuration, even if an external electrical noise such as an electrostatic noise is given, the signal line of the reference oscillation signal is difficult to be influenced by the electrical noise because it is made low in impedance by the emitter follower circuit 43. The series resonance circuit 50 resonates the reference oscillation signal at a resonance frequency of the reference oscillation frequency and hence prevents attenuation of the reference oscillation signal. Consequently, the local oscillator circuit 13 can acquire the reference oscillation signal which is not attenuated. Accordingly, even when the distance from the crystal oscillator circuit is long and so is the signal line of the reference oscillation signal, the local oscillator circuit 13 can utilize the reference oscillation signal provided from the crystal oscillator circuit.

The microcomputer 60 makes control for the whole of this combined voice FM broadcast receiver and television. When receiving a broadcasting radio wave in voice FM broadcast, the microcomputer 60 makes control to let the switching circuit 17 to switch over to the side where the intermediate frequency signal is allowed to pass through the band-pass filter circuit 16 and at the same time makes control to let the VCO circuit 32 change the oscillation frequency of the oscillation signal to the oscillation frequency associated with the broadcasting radio wave in voice FM broadcast. For these controls the microcomputer 60 incorporates therein a CPU 61, a ROM 62, a RAM 63, a D/A converter 64, as well as an A/D converter and a timer circuit (neither shown). The CPU 61 executes a predetermined program stored in the ROM 62 and controls the whole of the combined voice FM broadcast receiver and television.

Figure 6:
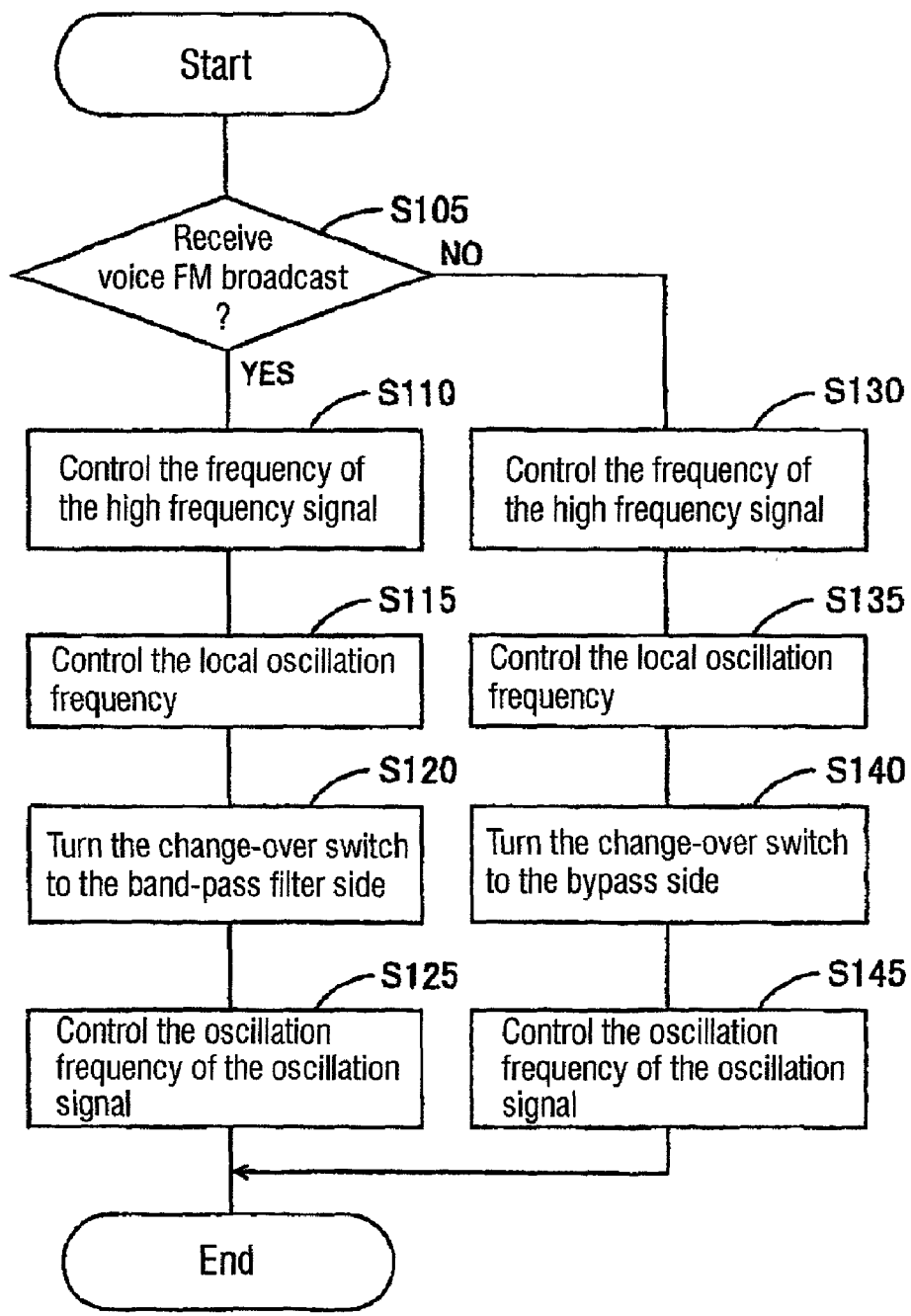
FIG. 6 is a flowchart showing schematically a control processing carried out by a microcomputer.

FIG. 6 shows schematically in terms of a flowchart a control processing which is carried out by the microcomputer 60. In the same figure, first there is made judgment as to whether voice FM broadcast is to be received or not for example on the basis of operation on an operation panel (step S105). If the answer is affirmative, the processing flow advances to step S110, in which a control voltage for making the frequency of the high frequency signal into a desired frequency corresponding to the channel-selected voice FM broadcast is outputted to the high frequency amplifier circuit 12 via the D/A converter 64. With this processing, the frequency of the high frequency signal produced by the high frequency amplifier circuit 12 can be controlled. Next, a control voltage for controlling the local oscillation frequency of the local oscillation signal into a frequency corresponding to the desired frequency is outputted to the local oscillator circuit 13 via the D/A converter 64 (step S115). With this processing, it is possible to control the local oscillation frequency of the local oscillation signal produced by the local oscillator circuit 13.

Further, a signal for switching the switch 17*a* to the band-pass filter 16*a* side is produced and outputted to the switching circuit 17 (step S120). That is, when receiving the broadcasting radio wave in voice FM broadcast, there is made control to switch the switching circuit 17 to the side where the intermediate frequency signal is passed through the band-pass filter circuit 16. This signal has two states of high and low levels, one of which causes the switch 17*a* to switch over to the band-pass filter 16*a* side and the other of which causes the switch 17*a* to switch over to the bypass side. In accordance with the above control the switch 17*a* switches to the band-pass filter 16*a* side, allowing the intermediate frequency signal to pass through the band-pass filter 16*a*.

Then, a control voltage for controlling the oscillation frequency of the oscillation signal into the oscillation frequency corresponding to the broadcasting radio wave in voice FM broadcast is outputted to the local oscillator circuit 13 via the D/A converter 64 (step S125) and this processing flow is ended. With this processing, it is possible to control the oscillation frequency of the oscillation signal produced by the VCO circuit 32.

On the other hand, if it is judged in step S105 that the voice FM broadcast is not to be received, this means that television broadcast is to be received, so the processing flow advances to step S130, in which a control voltage for controlling the frequency of the high frequency signal into a desired frequency corresponding to the channel-selected television broadcast is outputted to the high frequency amplifier 12 via the D/A converter 64. Next, a control voltage for controlling the local oscillation frequency of the local oscillation signal into the frequency corresponding to the desired frequency is outputted to the local oscillator circuit 13 via the D/A converter 64 (step S135).

Further, a signal for switching the switch 17*a* to the bypass side is produced and outputted to the switching circuit 17 (step S140). With the switch 17*a* on the bypass side, the intermediate frequency signal does not pass through the band-pass filter 16*a*. Then, a control voltage for controlling the oscillation frequency of the oscillation signal into the oscillation frequency corresponding to the broadcasting radio wave in FM broadcast is outputted to the local oscillator circuit 13 via the D/A converter 64 (step S145) and this processing flow is ended.

With the above processing, even when receiving the broadcasting radio wave in voice FM broadcast, it is possible to remove a disturbance component from the intermediate frequency signal and perform intermediate frequency amplification and detection by utilizing the SAW filter 20 and chroma IC 30 for the reception of television broadcast. In this case it is not necessary to separately provide an SAW filter and a voice intermediate frequency amplifier circuit.

The microcomputer 60 which, in accordance with the type of the received broadcasting radio wave, makes control to let the variable filter circuit 15 limit the frequency band of the intermediate frequency signal passing therethrough and also makes control to let the VCO circuit 32 change the oscillation frequency of the oscillation signal, constitutes the control means as referred to in the present invention.

Figure 7:
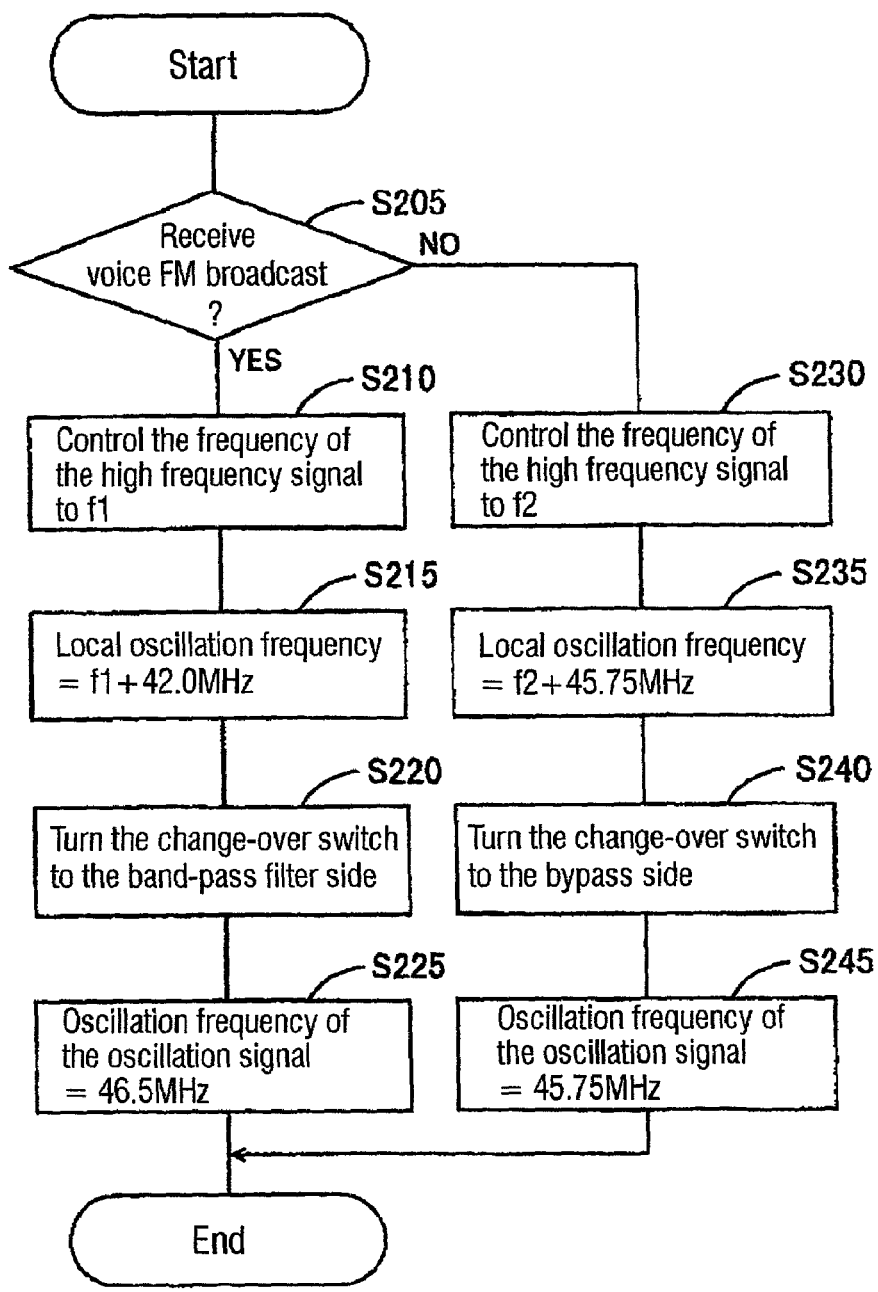
FIG. 7 is a flowchart showing an example of a control processing carried out by the microcomputer.
Figure 8:
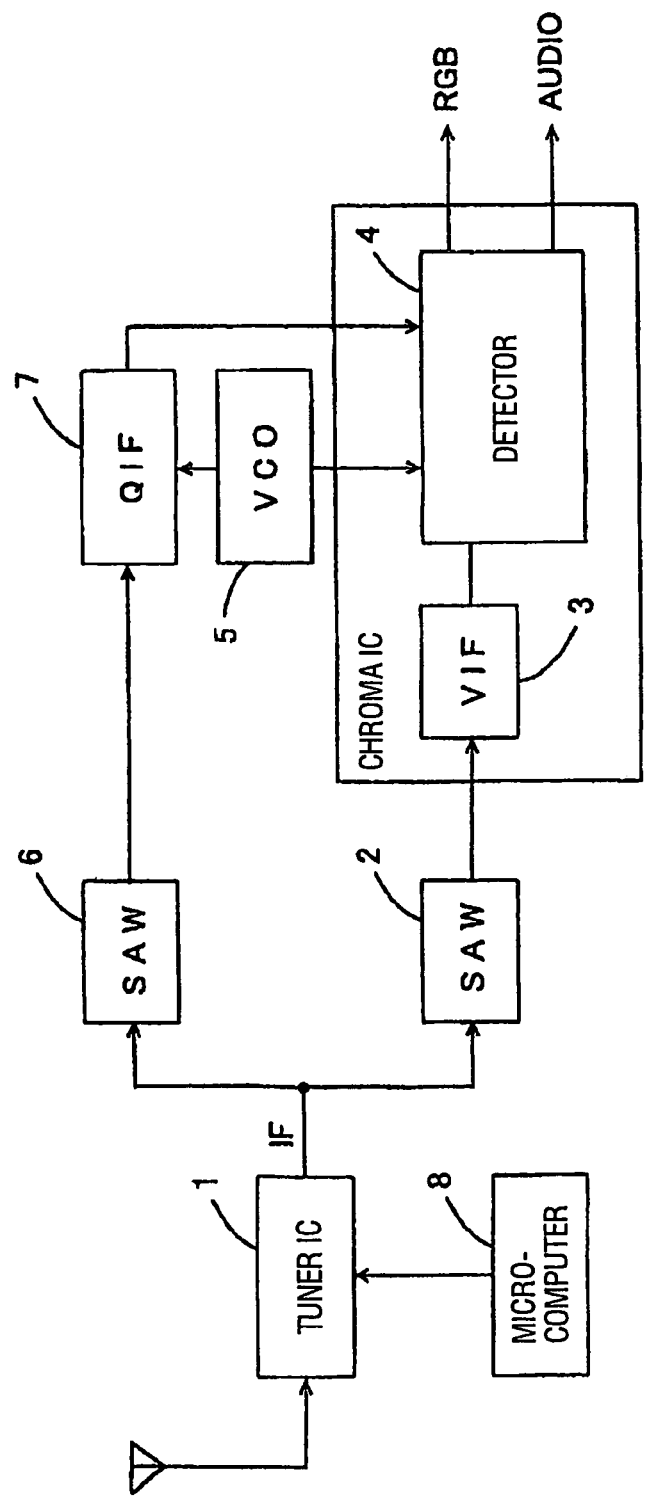
FIG. 8 is a block diagram showing schematically the configuration of a conventional broadcast receiving system.

The operation of the broadcast receiving system 100 will be described below. It is here assumed that the frequency passing characteristic of the band-pass filter 16*a* is 42.0±1.0 MHz and that the microcomputer 60 makes control in accordance with the flowchart of FIG. 7.

In the same figure, first there is made judgment as to whether voice FM broadcast is to be received or not (step S205). If the answer is affirmative, the processing flow advances to step S210, in which the frequency of the high frequency signal produced by the high frequency amplifier circuit 12 is controlled as noted earlier. For example, if a desired frequency of the channel-selected voice FM broadcast is f1=90 MHz, a control voltage for controlling the frequency of a high frequency signal to f1=90 MHz is outputted to the high frequency amplifier circuit 12 via the D/A converter 64.

Then, in accordance with the inputted control voltage the high frequency amplifier circuit 12 receives the broadcasting radio wave corresponding to the desired frequency f1 through the antenna 11 and amplifies it to produce a high frequency signal. The high frequency signal thus produced is outputted to the mixing circuit 14.

Next, the microcomputer 60 outputs a control voltage for controlling the local oscillation frequency of the local oscillation signal into f1+42.0 MHz to the local oscillator circuit 13 via the D/A converter 64 (step S215). This 42.0 MHz is different from 45.75 MHz in the reception of television broadcast which will be described later. Then, the local oscillator circuit 13 produces, with a PLL circuit, a local oscillation signal with a local oscillation frequency of f1+42.0 MHz corresponding to the desired frequency f1 of the broadcasting radio wave and outputs it to the mixing circuit 14. For example, in the case of the desired frequency being 90 MHz, the local oscillation frequency is 132.0 MHz.

The mixing circuit 14, to which are inputted both high frequency signal and local oscillation signal, mixes both signals to make conversion into a high frequency signal. The frequency of the intermediate frequency signal corresponds to the difference of 42.0 MHz between the frequency f1 (MHz) of the high frequency signal and the local oscillation frequency f1+42.0 MHz. The mixing circuit 14 outputs the intermediate frequency signal of 42.0 MHz to the variable filter circuit 15.

Further, the microcomputer 60 produces a high or low level signal for switching the switch 17*a* to the band-pass filter side 16*a* as noted above and provides it to the switching circuit 17 (step S220). With this input signal, the switch 17*a* is switched to the band-pass filter 16*a* side, so that the variable filter circuit 15 allows the intermediate frequency signal to pass through the band-pass filter 16*a* and cuts off a component outside the range of 42.0±1.0 MHz. As a result, a disturbance component contained in the intermediate frequency signal for voice FM broadcast is removed.

The intermediate frequency signal which has passed through the variable filter circuit 15 is inputted to the SAW filter 20. The SAW filter 20 allows the intermediate frequency signal to pass therethrough as it is because it includes the frequency band limited by the band-pass filter 16*a*. The intermediate frequency signal having passed through the SAW filter 20 is inputted to the VIF circuit 31.

The VIF circuit 31 subjects the intermediate frequency signal having passed through the SAW filter 20 to intermediate frequency amplification and outputs the amplified intermediate frequency signal to the detector circuit 33.

Then, the microcomputer 60 outputs a control voltage for controlling the oscillation frequency of the oscillation signal into 46.5 MHz to the VCO circuit 32 via the D/A converter 64 (step S225) and terminates this processing flow. Subsequently, the VCO circuit 32 generates an oscillation signal at an oscillation frequency of 46.5 MHz corresponding to the control voltage and provides it to the detector circuit 33.

The detector circuit 33, to which are inputted both amplified intermediate frequency signal and oscillation signal, mixes the voice component contained in the intermediate frequency signal with the oscillation signal to produce a second voice intermediate frequency signal. The frequency of the second voice intermediate frequency signal corresponds to the difference of 4.5 MHz between the frequency 42.0 MHz of the intermediate frequency signal and the oscillation frequency 46.5 MHz. The detector circuit 33 performs FM detection from the second voice intermediate frequency signal of 4.5 MHz to afford an AUDIO signal and output the AUDIO signal to the exterior.

As a result, the user can listen to the voice FM broadcast from the speaker 84.

To be more specific, when receiving the voice FM broadcast, the intermediate frequency signal passing through the SAW filter 20 of a wide passing frequency band is limited up to the frequency band at which the disturbance component is removed. Therefore, even without separately providing an SAW filter for voice FM broadcast reception and a voice intermediate frequency amplifier circuit other than the television broadcast receiving SAW filter 20 and chroma IC 30, the broadcast receiving system 100 can remove the disturbance component from the intermediate frequency signal and perform intermediate frequency amplification and detection.

Since it is possible to make control to change the oscillation frequency of the oscillation signal generated by the VCO circuit 32, the limitation on the frequency band of the intermediate frequency signal can be determined freely within the passing frequency band of the SAW filter 20 during the reception of voice FM broadcast.

On the other hand, in the case of receiving television broadcast, the microcomputer 60 judges in step S205 that voice FM broadcast is not to be received, and makes control to receive the broadcasting radio wave in the television broadcast in accordance with the flow of steps S230 to S345.

More specifically, the frequency of the high frequency signal produced by the high frequency amplifier circuit 12 is controlled (step S230). For example, if a desired frequency corresponding to the channel-selected television broadcast is f2=200 MHz, a control voltage for controlling the frequency of the high frequency signal to f2=200 MHz is outputted to the high frequency amplifier circuit 12 via the D/A converter 64. The high frequency amplifier circuit 12 receives the broadcasting radio wave corresponding to the desired frequency f2 and amplifies it to produce a high frequency signal, then outputs the high frequency signal to the mixing circuit 14.

Next, the microcomputer 60 outputs a control voltage for controlling the local oscillation frequency into f2+45.75 (=245.75) MHz to the local oscillator circuit 13 (step S235), which in turn produces a local oscillation signal with a local oscillation frequency of f2+45.75 MHz corresponding to the desired frequency f2 and provides it to the mixing circuit 14. The mixing circuit 14 produces an intermediate frequency signal with a frequency corresponding to the difference of 45.75 MHz between the frequency f2 (MHz) of the high frequency signal and the local oscillation frequency f2+45.75 MHz and provides it to the variable filter circuit 15.

Further, the microcomputer 60 produces a signal for switching the switch 17a to the bypass side and outputs it to the switching circuit 17 (step S240). As a result, the variable filter 15 allows the intermediate frequency signal to pass as it is without passage through the band-pass filter 16a and provides it to the SAW filter 20. The SAW filter 20 removes a disturbance component lying outside the predetermined frequency band from the passing intermediate frequency signal and provides the signal to the VIF circuit 31. The VIF circuit 31 subjects the intermediate frequency signal to intermediate frequency amplification and provides it to the detector circuit 33.

Then, the microcomputer 60 outputs a control voltage for controlling the oscillation frequency of the oscillation signal into 45.75 MHz to the VCO circuit 32 (step S245) and terminates this processing flow. The VCO circuit 32 then outputs an oscillation frequency of 45.75 MHz to the detector circuit 33. The detector circuit 33 performs video detection from the amplified intermediate frequency signal while synchronizing to the oscillation signal of 45.75 MHz, separates RGB signal by performing a predetermined color demodulation and outputs it to the exterior. As to the audio signal, the detector circuit 33 mixes a voice component contained in the intermediate frequency signal with the oscillation signal to afford a second voice intermediate frequency signal. The frequency of the second voice intermediate frequency signal corresponds to the difference of 4.5 MHz between the frequency 41.25 MHz of the intermediate frequency signal and the oscillation frequency 45.75 MHz. Thereafter, an AUDIO signal is obtained by FM detection from the second voice intermediate frequency signal of 4.5 MHz and is outputted to the exterior.

As a result, the user can watch and listen to the television broadcast from the picture tube 82 and the speaker 84.

That is, when receiving television broadcast, the frequency band of the intermediate frequency signal passing through the SAW filter 20 is not limited. Therefore, even without changing the circuit configuration of the television broadcast receiving SAW filter and chroma IC, the broadcast receiving system 100 can receive television broadcast and perform intermediate frequency amplification and detection.

Thus, without separately providing such an SAW filter and voice intermediate frequency amplifier circuit as in the prior art, even the broadcast receiving system used in a combined voice FM broadcast receiver and television can perform intermediate frequency amplification and detection of the voice intermediate frequency signal resulting from disturbance component elimination and conversion. In this case, it is possible to change the oscillation frequency of the oscillation signal which the VCO circuit utilizes, so it is not necessary to let the pass band of the intermediate frequency signal match the oscillation frequency of the oscillation signal. Therefore, it is possible to improve the freedom of circuit design.

Further, the local oscillator circuit 13 can produce a local oscillation signal in accordance with the reference oscillation signal generated by the crystal oscillator circuit 40 which is connected to the VCO circuit 32. That is, it is unnecessary to provide a crystal oscillator circuit exclusive for the local oscillator circuit and hence it is possible to decrease the number of crystal oscillator used. Since the series resonance circuit prevents attenuation of the reference oscillation signal, the local oscillator circuit can acquire the reference oscillation signal which is not attenuated. At the same time, the reference oscillation signal is amplified by the emitter follower circuit and its output becomes low in impedance, whereby the influence of an electrical noise mixed therein can be diminished. For this reason, even when the distance from the crystal oscillator circuit is long and so is the signal line of the reference oscillation signal, the local oscillator circuit can utilize the reference oscillation signal provided from the crystal oscillator circuit.

Since the tuner IC 10 has a PLL circuit, it is easy to change the local oscillation frequency. Therefore, by utilizing this PLL circuit, there may be adopted a circuit configuration wherein the frequency band limited by the variable filter circuit 15 is controlled by the microcomputer 60. In this case, since the limitation on the frequency band of the intermediate frequency signal can be set freely by the microcomputer 60, it is possible to further improve the freedom of circuit design.

According to the present invention, as set forth above, it is possible to provide a broadcast receiving system which does not require a separate provision of a filter and an intermediate frequency amplifier circuit and which can improve the freedom of circuit design.

We claim:

1. A broadcast receiving system comprising:
   a high frequency amplifier circuit which receives and amplifies a broadcasting radio wave corresponding to a desired frequency and which provides an amplified output;
   a local oscillator circuit which produces and outputs in a PLL circuit a local oscillation signal having a local oscillation frequency corresponding to the desired frequency of the broadcasting radio wave;
   a mixing circuit which mixes the output provided from the high frequency amplifier circuit with the local oscillation signal provided from the local oscillator circuit to make conversion into an intermediate frequency signal and which outputs the intermediate frequency signal;
   a variable filter circuit which allows the intermediate frequency signal to pass therethrough, the variable filter circuit having a band-pass filter circuit which limits the frequency band of the signal passing therethrough and a switching circuit capable of switching whether the intermediate frequency signal outputted from the mixing circuit is to pass through or bypass the band-pass filter;

an SAW filter which allows the intermediate frequency signal having passed through the variable filter circuit to pass therethrough;

an intermediate frequency amplifier circuit for intermediate frequency amplification of the intermediate frequency signal having passed through the SAW filter;

a VCO circuit which generates an oscillation signal and which can change the oscillation frequency of the oscillation signal;

a detector circuit which, on the basis of the oscillation frequency of the oscillation signal, detects the intermediate frequency signal amplified by the intermediate frequency amplifier circuit and which outputs a video signal and an audio signal; and a microcomputer which, when receiving a broadcasting radio wave in voice FM broadcast, makes control for causing the switching circuit to switch over to the side where the intermediate frequency signal is allowed to pass through the band-pass filter circuit and for causing the VCO circuit to change the oscillation frequency of the oscillation signal into an oscillation frequency corresponding to the broadcasting radio wave in the voice FM broadcast.

2. A broadcast receiving system according to claim 1, wherein:

the high frequency amplifier circuit the local oscillator circuit, the mixing circuit, and the variable filter circuit are provided in a tuner IC which is connected to the microcomputer;

the intermediate frequency amplifier circuit, the detector circuit, and the VCO circuit are provided in a chroma IC which is connected not only to the microcomputer but also to the tuner IC through an SAW filter;

a crystal oscillator circuit which generates a reference oscillation signal of a predetermined oscillation frequency and which amplifies and outputs the reference oscillation signal through an emitter follower circuit, and a series resonance circuit connected to the crystal oscillator circuit and having a resonance frequency nearly equal to the predetermined oscillation frequency of the reference oscillation signal, are provided;

the VCO circuit produces the oscillation signal in accordance with the reference oscillation signal outputted from the crystal oscillator circuit; and the local oscillator circuit acquires the reference oscillation signal through the series resonance circuit and produces the local oscillation signal in accordance with the reference oscillation signal.

3. A broadcast receiving system comprising:

a tuner means which receives a broadcasting radio wave corresponding to a desired frequency and which converts it into an intermediate frequency signal and outputs the intermediate frequency signal;

a variable filter means which allows the intermediate frequency signal outputted from the tuner means to pass therethrough and which can change a limitation on the frequency band of the intermediate frequency signal passing therethrough;

a variable oscillator means which generates an oscillation signal and which can change the oscillation frequency of the oscillation signal;

an amplifier/detector means which, in accordance with the oscillation frequency of the oscillation signal, subjects the intermediate frequency signal having passed through the variable filter means to intermediate frequency amplification and detection and which outputs a video signal and an audio signal; and a control means which, in accordance with the type of the received broadcasting radio wave, makes control to let the variable filter means limit the frequency band of the intermediate frequency signal passing therethrough and let the variable oscillator means change the oscillation frequency of the oscillation signal, wherein the variable filter means is provided with a band-pass filter circuit which limits the frequency band of a signal passing therethrough and a switching circuit capable of switching whether the intermediate frequency signal is to pass through or bypass the band-pass filter circuit; and the control means makes control to let the switching circuit switch whether the intermediate frequency signal is to pass through or bypass the band-pass filter circuit in accordance with the type of the received broadcasting radio wave.

4. A broadcast receiving system according to claim 3, wherein:

when receiving a broadcasting radio wave in voice FM broadcast, the control means makes control to let the variable filter means limit the frequency band and let the variable oscillator means change the oscillation frequency of the oscillation signal into an oscillation frequency corresponding to the broadcasting radio wave in voice FM broadcast.

5. A broadcast receiving system according to claim 3, wherein:

when receiving a broadcasting radio wave in voice FM broadcast, the control means makes control to let the switching circuit switch the intermediate frequency signal to the side where the signal is allowed to pass through the band-pass filter circuit.

6. A broadcast receiving system according to claim 3, wherein:

the tuner means is provided with a local oscillator means which produces and outputs in a PLL circuit a local oscillation signal of a local oscillation frequency corresponding to a desired frequency of the broadcasting radio wave and is also provided with a mixing circuit which amplifies the inputted broadcasting radio wave and which mixes the thus-amplified signal with the local oscillation signal outputted from the local oscillator means to make conversion into an intermediate frequency signal, the mixing circuit then outputting the intermediate frequency signal to the variable filter means.

7. A broadcast receiving system according to claim 6, wherein:

the tuner means and the variable filter means are provided in a tuner IC;

the amplifier/detector means and the variable oscillator means are provided in a chroma IC which is connected to the tuner IC through an SAW filter; and the control means is provided in a microcomputer which is connected to both the tuner IC and the chroma IC.

8. A broadcast receiving system according to claim 6, wherein:

a crystal oscillator circuit for generating a reference oscillation signal of a predetermined oscillation frequency is provided;

the variable oscillator means produces the oscillation signal in accordance with the reference oscillation signal provided from the crystal oscillator circuit; and the local oscillator means produces the local oscillation signal in accordance with the reference oscillation signal.

9. A broadcast receiving system according to claim 8, wherein:
a resonance circuit is provided which is connected to the crystal oscillator circuit and whose resonance frequency is almost equal to the predetermined oscillation frequency of the resonance oscillation signal; and
the local oscillator means acquires the reference oscillation signal through the resonance circuit.

10. A broadcast receiving system according to claim 8, wherein:
the crystal oscillator circuit is provided with an emitter follower circuit which amplifies the reference oscillation signal and which outputs the thus-amplified signal.

11. A broadcast receiving method comprising:
receiving a broadcasting radio wave corresponding to a desired frequency and converting it into an intermediate frequency signal by means of a tuner;
allowing the intermediate frequency signal to pass through a variable filter which is provided with a band-pass filter circuit which limits the frequency band of a signal passing therethrough and a switching circuit capable of switching whether the intermediate frequency signal is to pass through or bypass the band-pass filter circuit in accordance with the type of the received broadcasting radio wave;
subjecting the intermediate frequency signal having passed through the variable filter to intermediate frequency amplification and simultaneous detection in accordance with an oscillation frequency provided from a variable oscillator which can change the oscillation frequency of an oscillation signal; and
outputting a video signal and an audio signal,
wherein according to the type of the received broadcasting radio wave there is made control to let the switching circuit switch whether the intermediate frequency signal is to pass through or bypass the band-pass filter circuit, and let the variable oscillator change the oscillation frequency of the oscillation signal.

12. A program storage device readable by a machine tangibly embodying a program of instruction executable by the machine to perform method steps for broadcast reception control, said method comprising:
receiving a broadcasting radio wave corresponding to a desired frequency, converting it into an intermediate frequency signal by means of a tuner,
allowing the intermediate frequency signal to pass through a variable filter which is provided with a band-pass filter circuit which limits the frequency band of a signal passing therethrough and a switching circuit capable of switching whether the intermediate frequency signal is to pass through or bypass the band-pass filter circuit, in accordance with the type of the received broadcasting radio wave;
subjecting the intermediate frequency signal having passed through the variable filter to intermediate frequency amplification and simultaneous detection in accordance with an oscillation frequency provided from a variable oscillator which can change the oscillation frequency of an oscillation signal, and
outputting a video signal and an audio signal, wherein according to the type of the received broadcasting radio wave there is made control to let the switching circuit switch whether the intermediate frequency signal is to pass through or bypass the band-pass filter circuit, and let the variable oscillator change the oscillation frequency of the oscillation signal.

* * * * *